US009500333B1

(12) United States Patent
Johnson et al.

(10) Patent No.: US 9,500,333 B1
(45) Date of Patent: Nov. 22, 2016

(54) PHOSPHORESCENT LIGHTING ASSEMBLY

(71) Applicant: Ford Global Technologies, LLC, Dearborn, MI (US)

(72) Inventors: Aaron Bradley Johnson, Allen Park, MI (US); Stuart C. Salter, White Lake, MI (US); Stephen Kenneth Helwig, Farmington Hills, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/974,469

(22) Filed: Dec. 18, 2015

(51) Int. Cl.
| B60Q 1/00 | (2006.01) |
| B60Q 3/00 | (2006.01) |
| B60Q 11/00 | (2006.01) |
| F21S 8/10 | (2006.01) |
| B60R 13/00 | (2006.01) |

(52) U.S. Cl.
CPC .......... F21S 48/1233 (2013.01); B60R 13/005 (2013.01); F21S 48/115 (2013.01); F21S 48/125 (2013.01); F21S 48/1241 (2013.01); F21S 48/1347 (2013.01)

(58) Field of Classification Search
CPC ............... F21S 48/115; F21S 48/1233; F21S 48/1241; F21S 48/125; F21S 48/1347; B60Q 13/005
USPC .................................. 362/507, 509–510, 538
See application file for complete search history.

(56) References Cited

U.S. PATENT DOCUMENTS

| 5,709,453 | A |   | 1/1998 | Krent et al. |
| 5,931,566 | A | * | 8/1999 | Fraizer ...................... F21V 3/04 |
|           |   |   |        | 362/293 |
| 6,117,362 | A |   | 9/2000 | Yen et al. |
| 6,471,368 | B1 | * | 10/2002 | Lin ...................... B60Q 1/0052 |
|           |   |   |        | 362/216 |
| 6,577,073 | B2 |   | 6/2003 | Shimizu et al. |
| 6,729,738 | B2 |   | 5/2004 | Fuwausa et al. |
| 6,737,964 | B2 |   | 5/2004 | Samman et al. |
| 6,773,129 | B2 |   | 8/2004 | Anderson, Jr. et al. |
| 6,820,888 | B1 |   | 11/2004 | Griffin |
| 6,851,840 | B2 |   | 2/2005 | Ramamurthy et al. |
| 6,859,148 | B2 |   | 2/2005 | Miller |
| 6,871,986 | B2 |   | 3/2005 | Yamanaka et al. |
| 6,893,147 | B2 |   | 5/2005 | Schottland et al. |
| 6,942,370 | B2 |   | 9/2005 | Futschik et al. |
| 6,953,536 | B2 |   | 10/2005 | Yen et al. |
| 6,990,922 | B2 |   | 1/2006 | Ichikawa et al. |
| 7,161,472 | B2 |   | 1/2007 | Strumolo et al. |
| 7,213,923 | B2 |   | 5/2007 | Liu et al. |
| 7,264,366 | B2 |   | 9/2007 | Hulse |
| 7,264,367 | B2 |   | 9/2007 | Hulse |

(Continued)

FOREIGN PATENT DOCUMENTS

| CN | 101337492 A | 1/2008 |
| CN | 201169230 Y | 2/2009 |

(Continued)

Primary Examiner — Jason Moon Han
(74) Attorney, Agent, or Firm — Jason Rogers; Price Heneveld LLP

(57) ABSTRACT

A vehicle lighting assembly is provided herein. The vehicle lighting assembly includes a housing including a lens and a bezel. A lamp is arranged to direct light through the lens. A phosphorescent structure is disposed on the lens. The phosphorescent structure is configured to emit light in response to an activation emission. A light source is configured to illuminate a portion of the bezel.

15 Claims, 14 Drawing Sheets

(56) References Cited

U.S. PATENT DOCUMENTS

| | | |
|---|---|---|
| 7,303,319 B2 | 12/2007 | Holtz et al. |
| 7,441,914 B2 | 10/2008 | Palmer et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 * | 11/2011 | Bucher ............... B60Q 1/0052 362/510 |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,773,012 B2 | 7/2014 | Ryu et al. |
| 8,846,184 B2 | 9/2014 | Agrawal et al. |
| 8,939,621 B2 | 1/2015 | Brown et al. |
| 8,952,341 B2 | 2/2015 | Kingsley et al. |
| 9,057,021 B2 | 6/2015 | Kingsley et al. |
| 9,065,447 B2 | 6/2015 | Buttolo et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0078766 A1 | 3/2014 | Giametta |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| DE | 102012001499 A1 | 8/2013 |
| EP | 1793261 A1 | 6/2007 |
| EP | 2778209 A1 | 9/2014 |
| JP | 2000159011 A | 6/2000 |
| JP | 2007238063 A | 9/2007 |
| JP | 2013149553 A | 8/2013 |
| WO | 2006047306 A1 | 5/2006 |
| WO | 2014068440 A1 | 5/2014 |

* cited by examiner

PHOSPHORESCENT LIGHTING ASSEMBLY

FIELD OF THE INVENTION

The present disclosure generally relates to vehicle lighting assemblies, and more particularly, to vehicle lighting assemblies employing one or more phosphorescent structures.

BACKGROUND OF THE INVENTION

Illumination arising from the use of luminescent structures offers a unique and attractive viewing experience. It is therefore desired to implement such structures in automotive vehicles for various lighting applications.

SUMMARY OF THE INVENTION

According to one aspect of the present invention, a vehicle lighting assembly is disclosed. The light assembly includes a housing having a lens and a bezel. A lamp is arranged to direct light through the lens. A phosphorescent structure is disposed on the lens. The phosphorescent structure is configured to emit light in response to an activation emission. A light source is configured to illuminate a portion of the bezel.

According to another aspect of the present invention, a vehicle headlamp assembly is disclosed. The vehicle headlamp assembly includes a bezel defining a lens. A lamp is arranged to direct light through the lens. Indicia is formed from a phosphorescent structure disposed on the lens. The phosphorescent structure is configured to emit light in response to an activation emission.

According to yet another aspect of the present invention, A vehicle lighting assembly is disclosed. The vehicle lighting assembly includes a housing having a lens and a bezel. A lamp is arranged to direct light through the lens at a first intensity. A phosphorescent structure is disposed on the lens and is configured to emit light in response to an activation emission at a second intensity. The first intensity of emitted light is greater than the second intensity of light.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
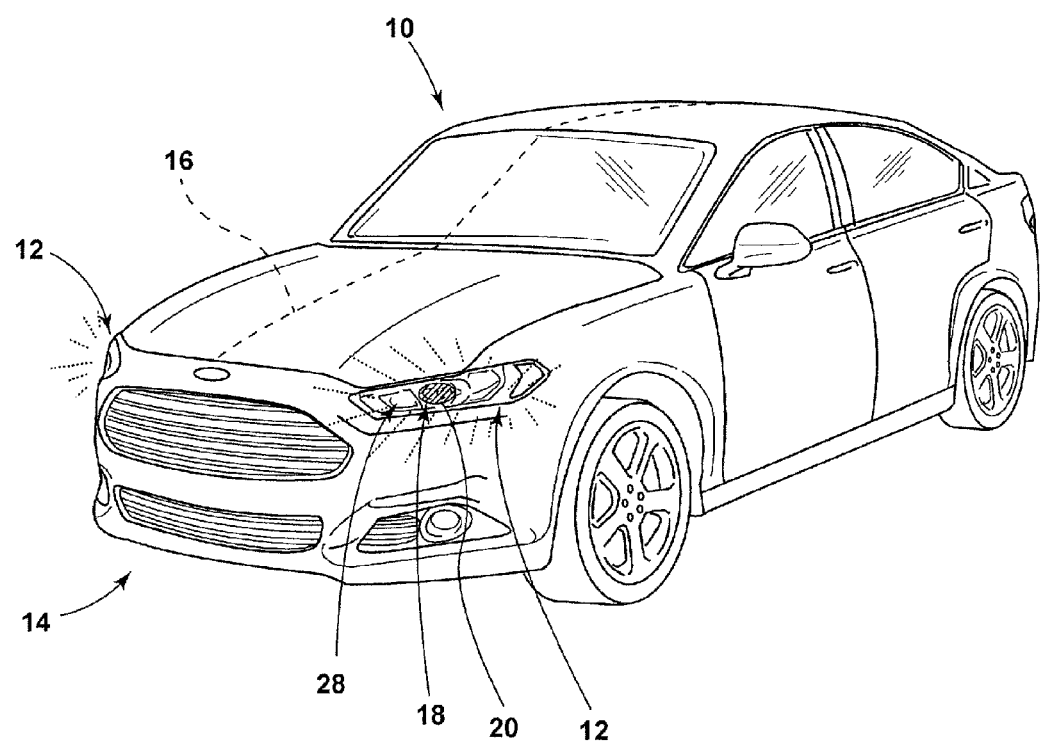
FIG. 1 is a front perspective view of a vehicle equipped with a vehicle lighting assembly having indicia on a lens of the lighting assembly, according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone;

A and B in combination; A and C in combination; B and C in combination; or A, B, and C in combination.

The following disclosure describes a lighting assembly. The lighting assembly may advantageously employ one or more phosphorescent and/or photoluminescent structures to illuminate in response to pre-defined events. The one or more photoluminescent structures may be configured to convert ambient light and/or light received from an associated light source and re-emit the light at a different wavelength typically found in the visible spectrum.

Figure 2:
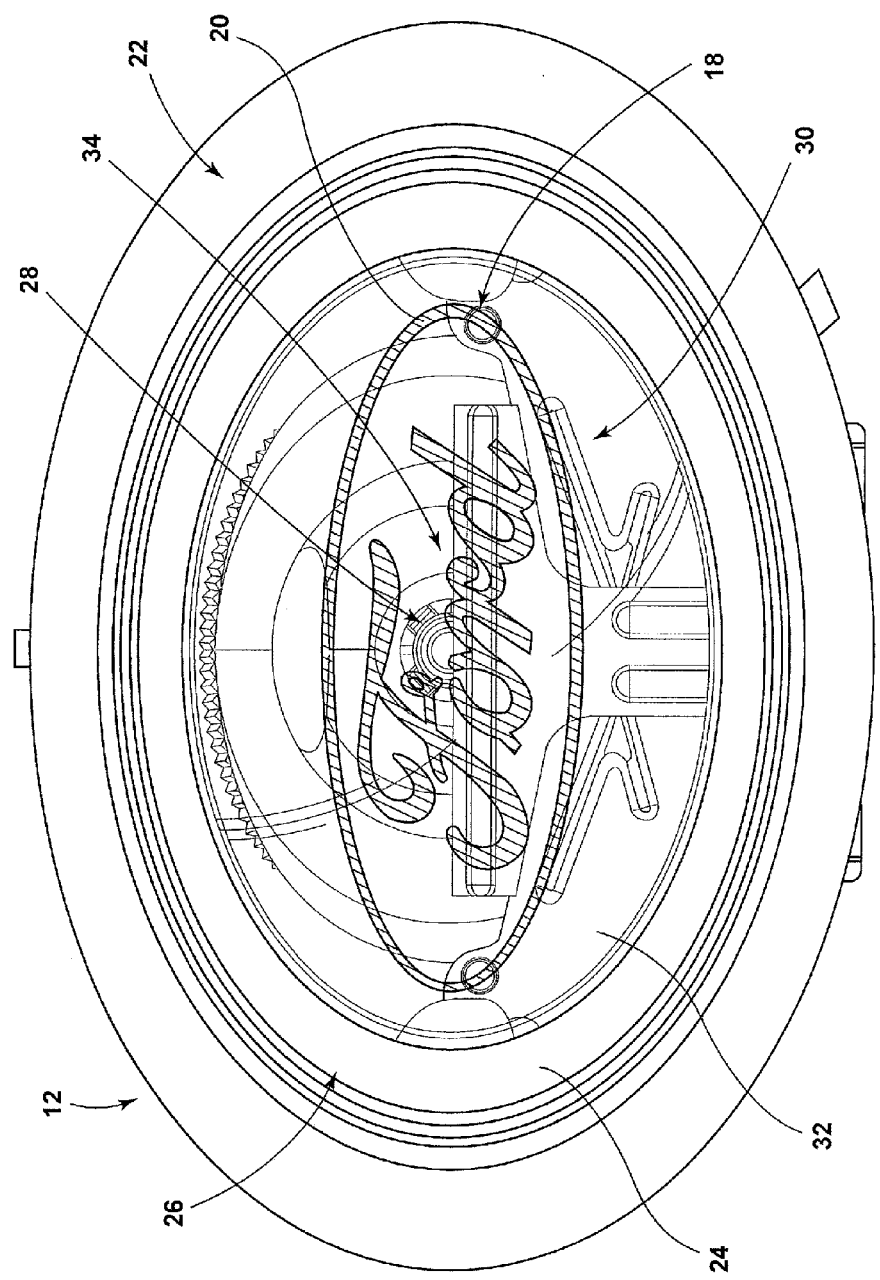
FIG. 2 is an enlarged front view of the lighting assembly illustrating the indicia formed from a phosphorescent structure.
Figure 3:
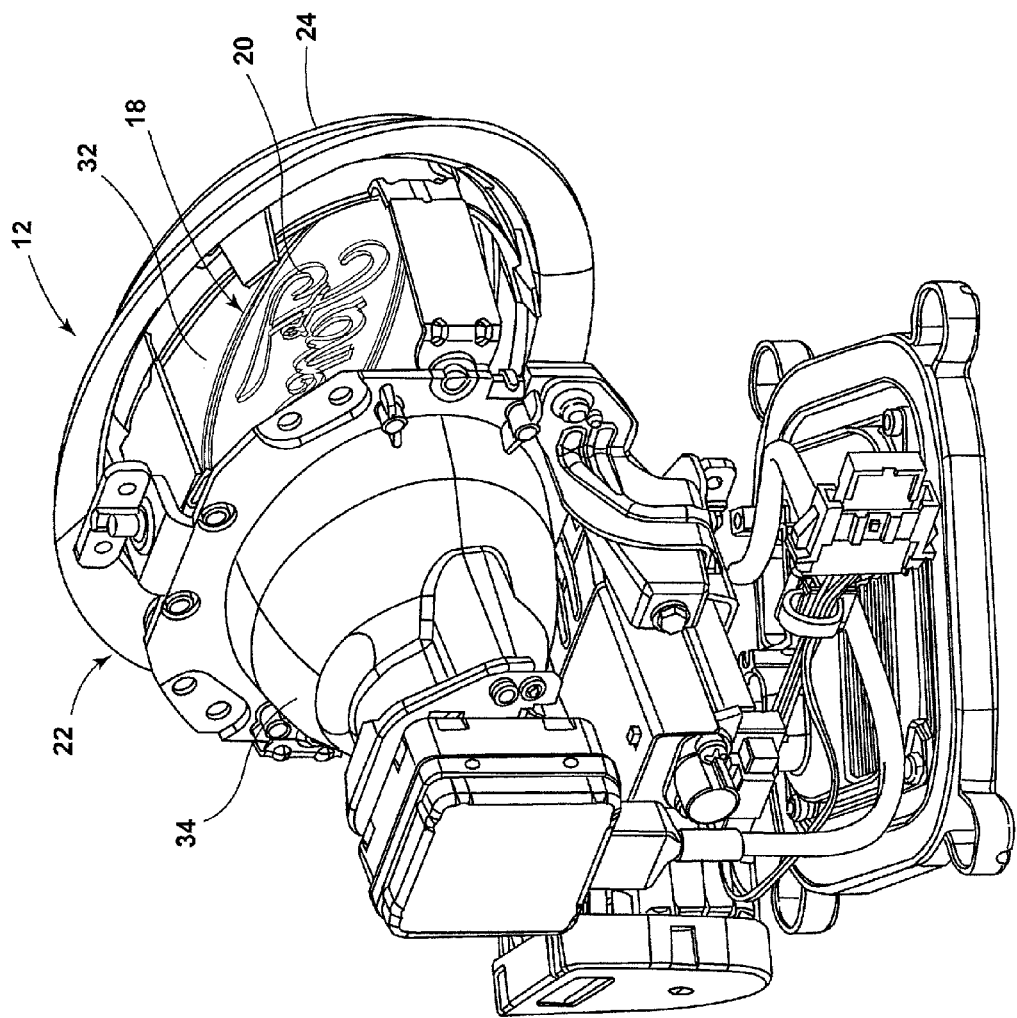
FIG. 3 is a rear perspective view of the lighting assembly shown with the indicia disposed on the lens.

Referring to FIGS. 1-3, an automotive wheeled vehicle 10 is generally illustrated equipped with a pair of lighting assemblies 12 for providing vehicle exterior lighting. In the embodiment shown, the lighting assemblies 12 are configured as headlight or headlamp assemblies positioned near a front portion 14 of the vehicle 10 on opposing sides of a vehicle centerline 16. The lighting assemblies 12 provide exterior lighting for the vehicle 10, such as high and low beam headlight illumination that project light forward of the vehicle 10 and onto the roadway through the usage of one or more lamps 28. It should be appreciated that the lighting assemblies 12 may be located at other locations on the vehicle 10 and may be configured to provide other lighting functions such as a taillight, a turn light, a fog light, a daytime running light, or other lighting functions. The vehicle lighting assembly 12 may further be equipped with a phosphorescent structure 18. The phosphorescent structure 18 may form indicia 20 thereon, such as an emblem, logo, or any other desired information.

As illustrated in FIGS. 2-3, the vehicle lighting assembly 12 includes a housing 22, which generally defines a circular bezel 24 at a front side 26 of the housing 22 through which light output from the one or more lamps 28 may be transmitted through a transparent lens 32 covering the front side 26 of the housing 22. It will be understood, however, that the bezel 24, lens 32, and/or any other component of the lighting assembly 12 may be in any geometric shape without departing from the teachings provided herein. The one or more lamps 28 may be in the form of one or more incandescent or halogen bulbs, or a plurality of light emitting diodes (LEDs) and may be configured for any function such that light emitted therefrom is directed through a transparent portion of the housing 22. Light generated by the lamp(s) 28 passes generally through the lens 32 of the housing 22 to the outside environment when the lamp 28 is illuminated.

The lighting assembly 12 may further include a reflector 34, such as a parabolic reflector, generally located behind the lamp 28. The reflector 34 may be formed from a polymeric material or any other suitable material known in the art. The reflector 34 may include low and high-beam reflector surfaces. The low-beam reflector surfaces are shaped to generate a low-beam lighting pattern. The high-beam reflector surfaces are shaped to generate a high-beam lighting pattern. It should be appreciated that the reflector 34 may be one or more separate components disposed within the housing 22.

In some embodiments, the lighting assembly 12 may include an inner condenser lens extending across the light output window 30 at the front side 26 of the housing 22 forward of the lamp(s) 28. The inner condenser lens may concentrate and collect the light that passes through the light output window 30.

As illustrated in FIGS. 2-3, the lens 32 includes indicia 20 thereon. The indicia 20 may be disposed on the lighting assembly 12 through any method known in the art, including, but not limited to, printing, etching, silk-screening, painting, and/or through any other. According to one embodiment, the indicia 20 is formed from the phosphorescent structure 18, as will be described in greater detail below. Accordingly, when light is emitted from a lamp 28 within the lighting assembly 12, the lighting assembly 12 illuminates in the desired manner, such as high-beam headlights or low-beam headlights. When the lamp 28 within the lighting assembly 12 is unilluminated, the phosphorescent structure 18 continues to emit light, thereby providing continued, ambient illumination from the lighting assembly 12.

Figure 4B:
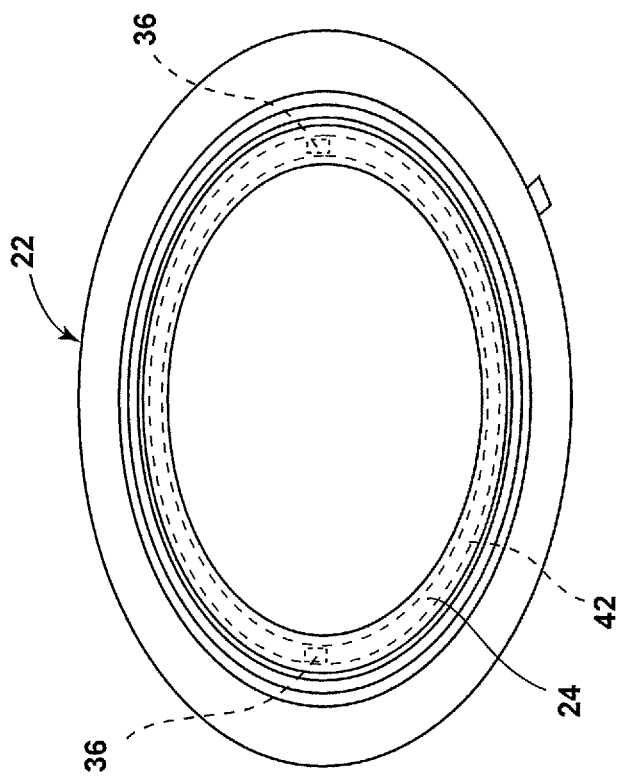
FIG. 4B is a front perspective view of an illuminate bezel configured to accept the lens in a central portion thereof.
Figure 4A:
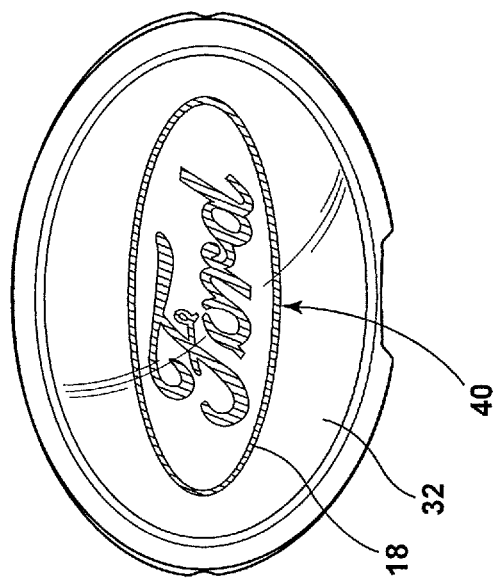
FIG. 4A is a front perspective view of a lens having phosphorescent indicia thereon.

As illustrated in FIG. 4A, the phosphorescent structure 18 may be integrally formed with and/or disposed on the lens 32 of the lighting assembly 12. The phosphorescent structure 18 may include one or more phosphorescent materials 40 configured to emit light once charged by activation emission, such as electromagnetic radiation, proximately disposed to the lighting assembly 12 (e.g., the lamp 28 within the lighting assembly 12, the sun, and/or any other light sources). In various embodiments, the phosphorescent materials 40 may include one or more persistent phosphor(s) and may be applied to the lens 32 by painting, screen printing, flexography, spraying, slot coating, dip coating, roller coating, bar coating, and/or any other methods known in the art.

The persistent phosphorescent materials 40 may be defined as being able to store an activation emission and release light gradually, for a period of several minutes or hours, once the activation emission is no longer present. The decay time may be defined as the time between the end of excitation from the activation emission and the moment when the light intensity of the phosphorescent structure 18 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

The persistent phosphorescent material 40, according to one embodiment, may be operable to emit light at or above an intensity of 0.32 mcd/m$^2$ after a period of 10 minutes. Additionally, the persistent phosphorescent material 40 may be operable to emit light above or at an intensity of 0.32 mcd/m$^2$ after a period of 30 minutes and, in some embodiments, for a period substantially longer than 60 minutes (e.g., the period may extend 8 hours or longer). Accordingly, the persistent phosphorescent material 40, when utilized within the lighting assembly 12 described herein, may continually illuminate in response to excitation through a plurality of excitation sources emitting an activation emission, including, but not limited to, ambient light (e.g., the sun), the lamp(s) 28 within the lighting assembly 12, the light source 36 proximate the bezel 24, and/or any other light source disposed onboard the vehicle 10. The periodic absorption of the activation emission from the excitation sources may provide for a substantially sustained charge of the persistent phosphorescent materials 40 to provide for a consistent passive illumination. In some embodiments, a light sensor may monitor the illumination intensity of the phosphorescent structure 18 and initiate an excitation source when the illumination intensity falls below 0.32 mcd/m$^2$, or any other predefined intensity level.

The persistent phosphorescent materials 40 may correspond to alkaline earth aluminates and silicates, for example doped di-silicates, or any other compound that is capable of emitting light for a period of time once an activation emission is no longer present. The persistent phosphorescent materials 40 may be doped with one or more ions, which may correspond to rare earth elements, for example, $Eu^{2+}$, $Tb^{3+}$ and/or $Dy^3$. According to one non-limiting exemplary embodiment, the phosphorescent structure 18 includes a phosphorescent material 40 in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The phosphorescent structure 18, according to one embodiment, may be a translucent white color when unilluminated. Once the phosphorescent structure 18 receives the activation emission of a particular wavelength, the phosphorescent structure 18 may emit blue light therefrom. The light emitted from the phosphorescent structure 18 may be of a desired brightness such that the indicia 20 is perceptible, but not so bright that an onlooker could not perceive the pattern of the indicia 20. According to one embodiment, the blue emitting phosphorescent material 40 may be $Li_2ZnGeO_4$ and may be prepared by a high temperature solid-state reaction method or through any other practicable method and/or process. The blue afterglow may last for a duration of two to eight hours and may originate from an activation emission and d-d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long persistent phosphor, such as Performance Indicator PI-BG20, and 12.5 parts of a dye solution containing 0.1% Lumogen Yellow F083 in dioxolane may be blended to yield a low rare earth mineral phosphorescent structure 18. It will be understood that the compositions provided herein are non-limiting examples. Thus, any phosphor known in the art may be utilized for utilization as a phosphorescent structure 18 without departing from the teachings provided herein. Moreover, it is contemplated that any long persistent phosphor known in the art may also be utilized without departing from the teachings provided herein.

Additional information regarding the production of long persistence luminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," issued Apr. 24, 2012, the entire disclosure of which is incorporated herein by reference. For additional information regarding long persistent phosphorescent structures, refer to U.S. Pat. No. 6,953,536 to Yen et al., entitled "LONG PERSISTENT PHOSPHORS AND PERSISTENT ENERGY TRANSFER TECHNIQUE," issued Oct. 11, 2005; U.S. Pat. No. 6,117,362 to Yen et al., entitled "LONG-PERSISTENCE BLUE PHOSPHORS," issued Sep. 12, 2000; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," issued Feb. 10, 2015, all of which are incorporated herein by reference in their entirety.

Referring to FIG. 4B, the bezel 24 surrounds the lens 32 and may illuminate in a plurality of functions. The light source 36 may comprise any form of light source. For example fluorescent lighting, light emitting diodes (LEDs), organic LEDs (OLEDs), polymer LEDs (PLEDs), solid state lighting, or any other form of lighting. The light source 36 may include any number of light sources that may be operably coupled with an optical grade light guide 42 which is a substantially transparent or translucent pipe suitable for transmitting light.

The light guide 42 may be formed from a rigid material that is comprised of a curable substrate such as a polymerizable compound, a mold in clear (MIC) material or mixtures thereof. Acrylates are also commonly used for forming rigid light pipes, as well as poly methyl methacrylate (PMMA) which is a known substitute for glass. A polycarbonate material may also be used in an injection molding process to form the rigid light guide 42. Further, the light guide 42 may be a flexible light guide 42, wherein a suitable flexible material is used to create the light guide 42. Such flexible materials include urethanes, silicone, thermoplastic polyurethane (TPU), or other like optical grade flexible materials. Whether the light guide 42 is flexible or rigid, the light guide 42, when formed, is substantially optically transparent and/or translucent and capable of transmitting light. The light guide 42 may be referred to as a light pipe, a light plate, a light bar or any other light carrying substrate made from a clear or substantially translucent plastic. Known methods of attaching the light guide 42 to the bezel 24 include the bonding of a preformed light guide 42 to the bezel 24 by adhesion, such as by using a double-sided tape, or by mechanical connections such as brackets that are formed into the bezel 24.

Alternatively, the lighting assembly 12 and light guide 42 may be integrally formed through a multi-shot molding process. Due to fabrication and assembly steps being performed inside the molds, molded multi-material objects allow significant reduction in assembly operations and production cycle times. Furthermore, the product quality can be improved, and the possibility of manufacturing defects, and total manufacturing costs can be reduced. In multi-material injection molding, multiple different materials are injected into a multi-stage mold. The sections of the mold that are not to be filled during a molding stage are temporally blocked. After the first injected material sets, then one or more blocked portions of the mold are opened and the next material is injected. This process continues until the required multi-material part is created.

According to one embodiment, a multi-shot molding process is used to create portions of the light guide 42, which may be integrally formed with the light source 36. Additional optics may also be molded into the light guide 42 during the multi-material injection molding process. Initially, lighting assembly 12 is formed through a first injection molding step. A light guide 42 is then molded and coupled to the lighting assembly 12 in a second injection molding step. Lastly, the light source 36, conductive leads 86, 88, and/or a heat sink is placed into the mold and thereby proximately disposed to the lighting assembly 12 and light guide 42 through injection molding or any other known attachment method, such as vibration welding. Integrally forming portions of the light guide 42, while encapsulating the light source 36, and portions of the conductive leads 86, 88, may protect the light guide 42 from physical and chemical damage arising from environmental exposure.

In alternative embodiments, additional components may be added during one of the injection steps, or successively added in additional injections to adhere more components to the light guide 42. In some embodiments, the light guide 42 may have a photoluminescent material 96 applied thereto. Moreover, the light guide 42 may be configured as a translucent material that allows the lamp 28 within the housing 22 to perform multiple light effects. For example, any lamp 28 within the housing 22 may be configured to have any primary function (e.g., a turn signal) and may illuminate the bezel 24 when the primary function is in a non-initiated state.

Figure 5B:
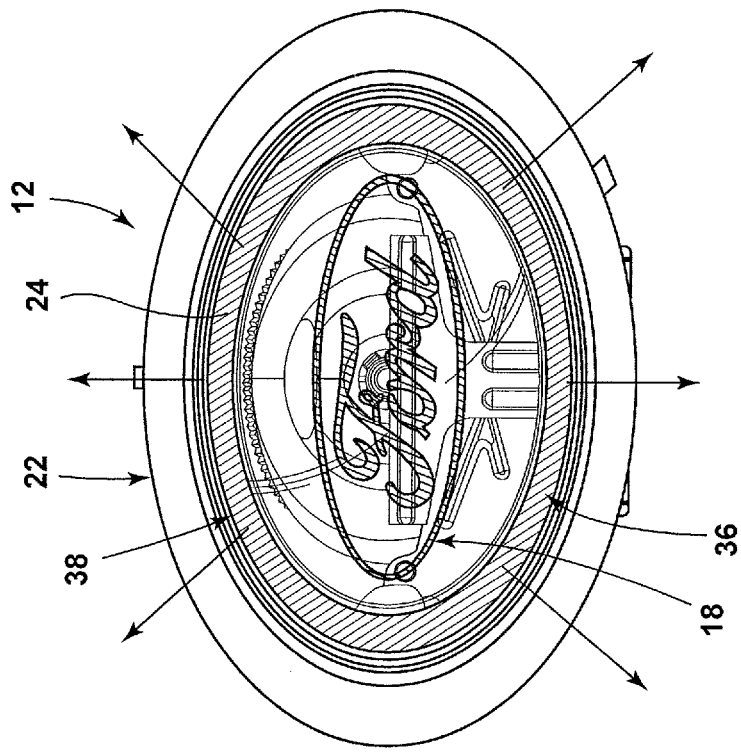
FIG. 5B is a front perspective view of the lighting assembly having the entire circumference of the bezel in an illuminated state.
Figure 5A:
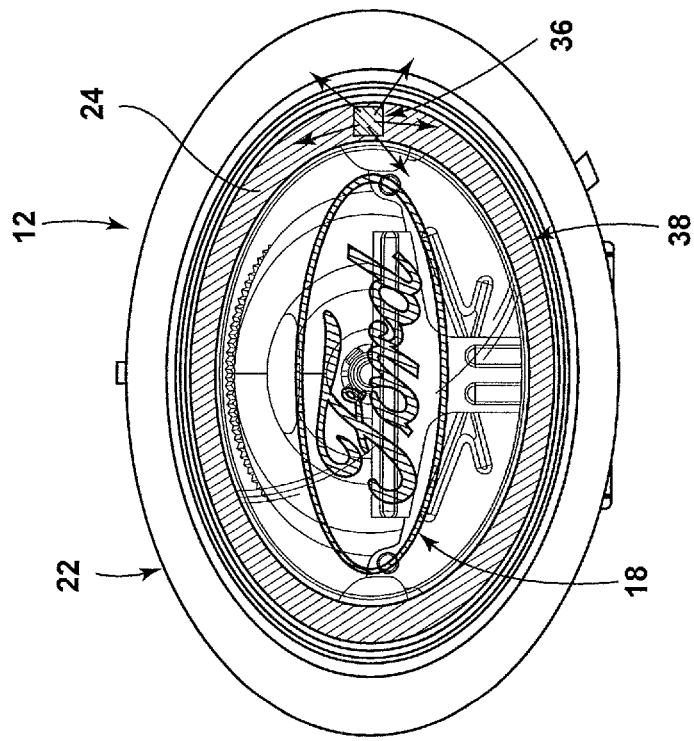
FIG. 5A is a front perspective view of the lighting assembly having indicia on the lens and a first portion of the bezel in an illuminated state.

Referring to FIGS. 5A-5B, the bezel 24 of the lighting assembly 12 may be configured as a daytime running lamp (DRL) 38. The DRL 38 may be controlled in coordination with and and/or all lamps 28 within the lighting assembly 12, and the DRL 38 may make it easier for others to notice the vehicle 10 at times when certain lamps 28 within the housing 22 are in an unilluminated state. According to one embodiment, the DRL 38 may change color and/or illumination pattern when the vehicle 10 performs predefined operations.

For example, according to one embodiment, the light source 36 may illuminate the bezel 24 in a first color (e.g., blue) when the vehicle 10 enters a welcome/farewell sequence as an occupant ingresses or egresses from the vehicle 10 for decoration. The illumination may continue for a set period of time after the occupant exits the vehicle 10. For example, the light source 36 may maintain the illuminated state for two minutes after a vehicle transmission is placed in a park position and/or after a vehicle engine is placed in an off condition. The light source 36 may illuminate the bezel 24 in a second color (e.g., red) when the vehicle transmission is placed in reverse. The light source 36 may illuminate the bezel 24 in a third color (e.g., amber) when hazard lights within the vehicle 10 are initiated. Additionally, or alternatively, the light source 36 may illuminate the bezel 24 in a fourth color (e.g., white) when the vehicle is running with the lamp(s) 28 within the lighting assembly 12 (e.g., headlight(s), turn indicator(s), etc.) in an unilluminated state. Furthermore, during any vehicular function, the light emitted from the bezel 24 may match the color of light simultaneously being emitted from the phosphorescent structure 18. It should be appreciated that the bezel 24 may illuminate in any number of colors for any reason without departing from the teachings provided herein.

According to an alternate embodiment, the bezel 24 may be configured as an auxiliary, or primary, turn indicator on the vehicle 10. As such, the light source 36 may illuminate the bezel 24 in a first color light (e.g., white) when the vehicle 10 is running with the lamp 28 in the unilluminated state. Once an occupant initiates a turn signal within the vehicle, the light source 36, on the side of the vehicle that corresponds to the direction of the turn signal, may illuminate in a second color (e.g., amber). Additionally, or alternatively, the light source 36 may dynamically illuminate in correlation with any vehicular event, such as the initiation of the turn indicator. For example, a portion of the bezel 24 may illuminate initially. The illuminated portion may progress around the bezel 24 such that the light appears to be circling around the bezel 24. Alternatively, the bezel 24 may progressively illuminate such that a portion is initially illuminated and the illuminated portion continually increases until the entire bezel 24 is illuminated. Alternatively still, the bezel 24 may blink in the second color as a predefined vehicular function occurs, and return to the first color once the vehicular operation is concluded.

Figure 6:
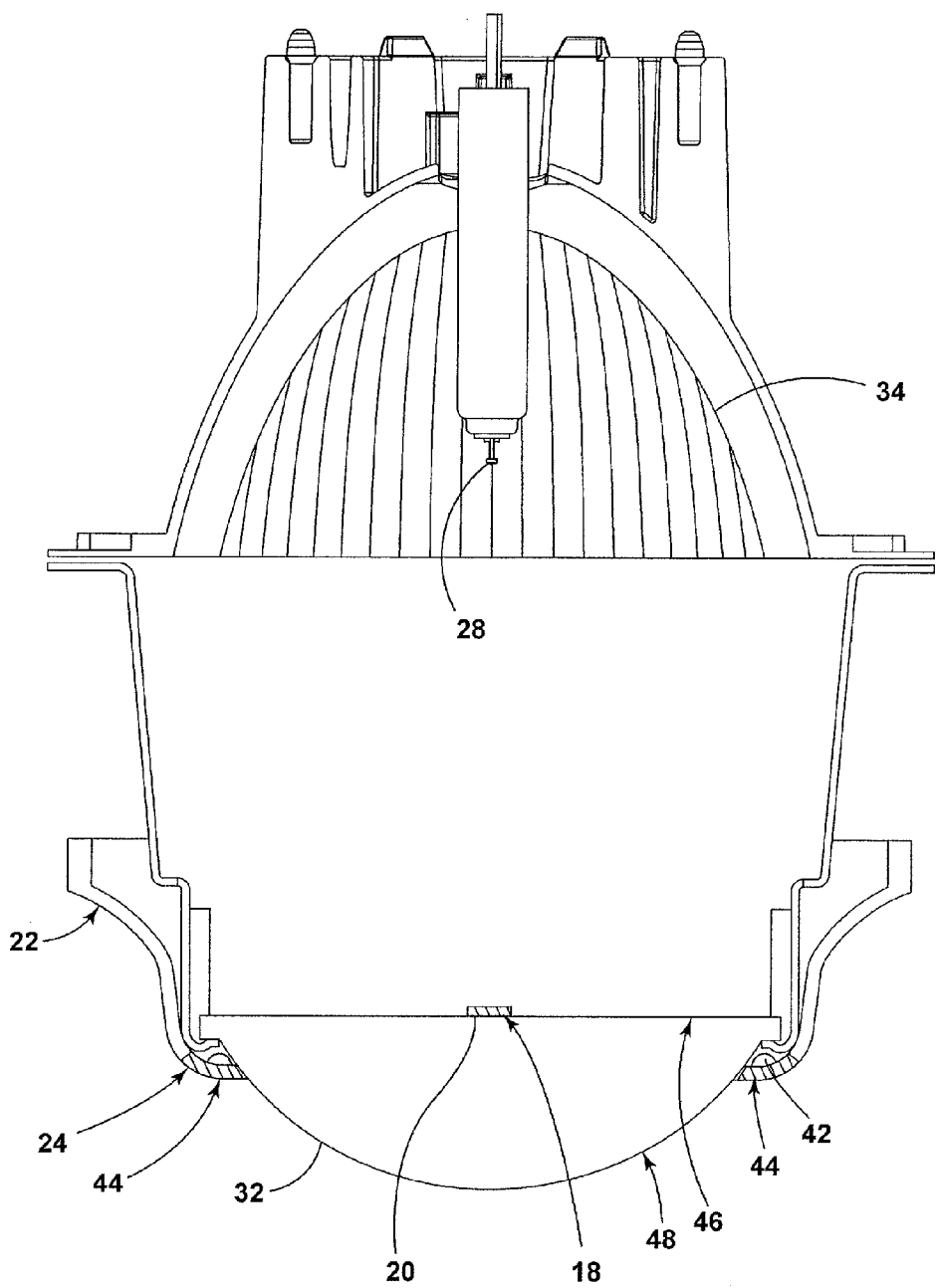
FIG. 6 is a top view of the lighting assembly with the phosphorescent indicia disposed on an inner surface of the lens and a light guide emitting light through the bezel.

With reference to FIG. 6, the lamp 28 may be configured as a projector lamp that projects light in a desired light beam pattern. In the headlamp embodiment, the projector lamp produces a light beam for use as a headlight. However, it should be appreciated that the lamp 28 may include other forms of light generators. The lamp 28 may operate at full power for headlight use and at a reduced power, e.g., fifty percent (50%), for emitting an activation emission to excite the phosphorescent structure 18, according to one embodiment.

Indicia 20 is formed from a phosphorescent material 40 that is disposed on the inner surface 46 of the lens 32 to protect the phosphorescent structure 18 from physical and chemical damage arising from environmental exposure. The phosphorescent structure 18 is formed such that the phosphorescent structure 18 may receive an activation emission while not impeding on the efficiency of the lamp 28 within the lighting assembly 12 while the lamp 28 is illuminated. Accordingly, the phosphorescent structure 18 may be light transmissive (i.e., transparent or translucent).

With further reference to FIG. 6, the bezel 24 includes a light transmissive portion 44 forwardly of the light guide 42. The light guide 42 may emit light through the light transmissive portion 44 and/or through the proximately disposed lens 32. Portions of the housing 22 that correlate to an A-surface of the housing 22 (e.g., the bezel 24) may be colored any color or may be metalized to give any desired portion of the housing 22 a metallic appearance. As used herein, the A-surface may be defined as any surface of the lighting assembly 12 that may be visible once the lighting assembly 12 is attached to the vehicle 10. The A-surface may include transparent and/or translucent portions thereby creating the light transmissive portion 44 within the housing 22. With respect to the illustrated embodiments, the bezel 24 may be metalized to give the housing 22 a metallic outer appearance thereon. For example, a metallic layer may be applied to the bezel 24 via partial vacuum deposition. According to an alternate embodiment, a metallic layer may be applied to any portion of the housing 22 via electroplating a thin layer of chromium thereon. Alternatively still, an imitator of chrome may be used for aesthetic purposes. The metallic layer may be light transmissive to allow light to pass therethrough from an inner side to an outer side. Alternate processes may be used for coloring or layering material onto a portion of the housing 22, as known in the art, without departing from the teachings provided herein.

Figure 7:
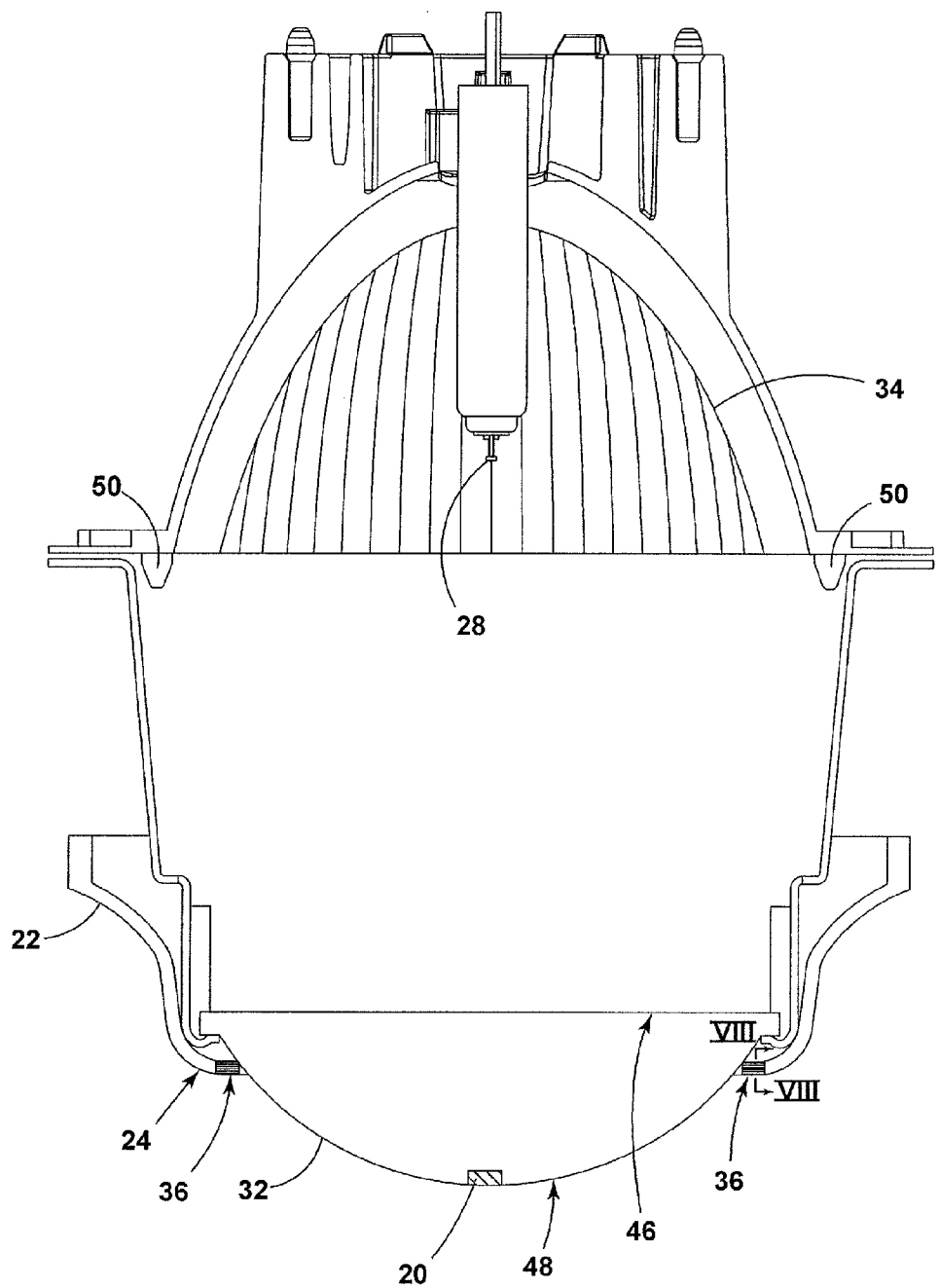
FIG. 7 is a top view of the lighting assembly with the phosphorescent indicia disposed on an outer surface of the lens and a light-producing assembly emitting light through the bezel.

With reference to FIG. 7, the bezel 24 may include and/or be integrally formed with the light source 36 that is capable of illuminating a portion of the housing 22. As illustrated, the phosphorescent structure 18 is disposed on an exterior surface 48 of the lens 32. Accordingly, the light source 36 may provide an activation emission for the phosphorescent structure 18 when the light source 36 is illuminated. Moreover, the light emitted from the light source 36 and the phosphorescent structure 18 may combine to form additional colors that may be emitted from the lighting assembly 12. According to one embodiment, the phosphorescent structure 18 may emit blue light while the light source 36 may backlight the indicia 20 through the lens 32.

With further reference to FIG. 7, a second light source 50 is disposed within the housing 22, proximate the reflector 34. The second light source 50 may be operably coupled with the bezel 24 for emitting light therethrough. Alternatively, the second light source 50 may emit an activation emission for the phosphorescent structure 18 or provide additional aesthetic benefits to the lighting assembly 12.

Figure 8A:
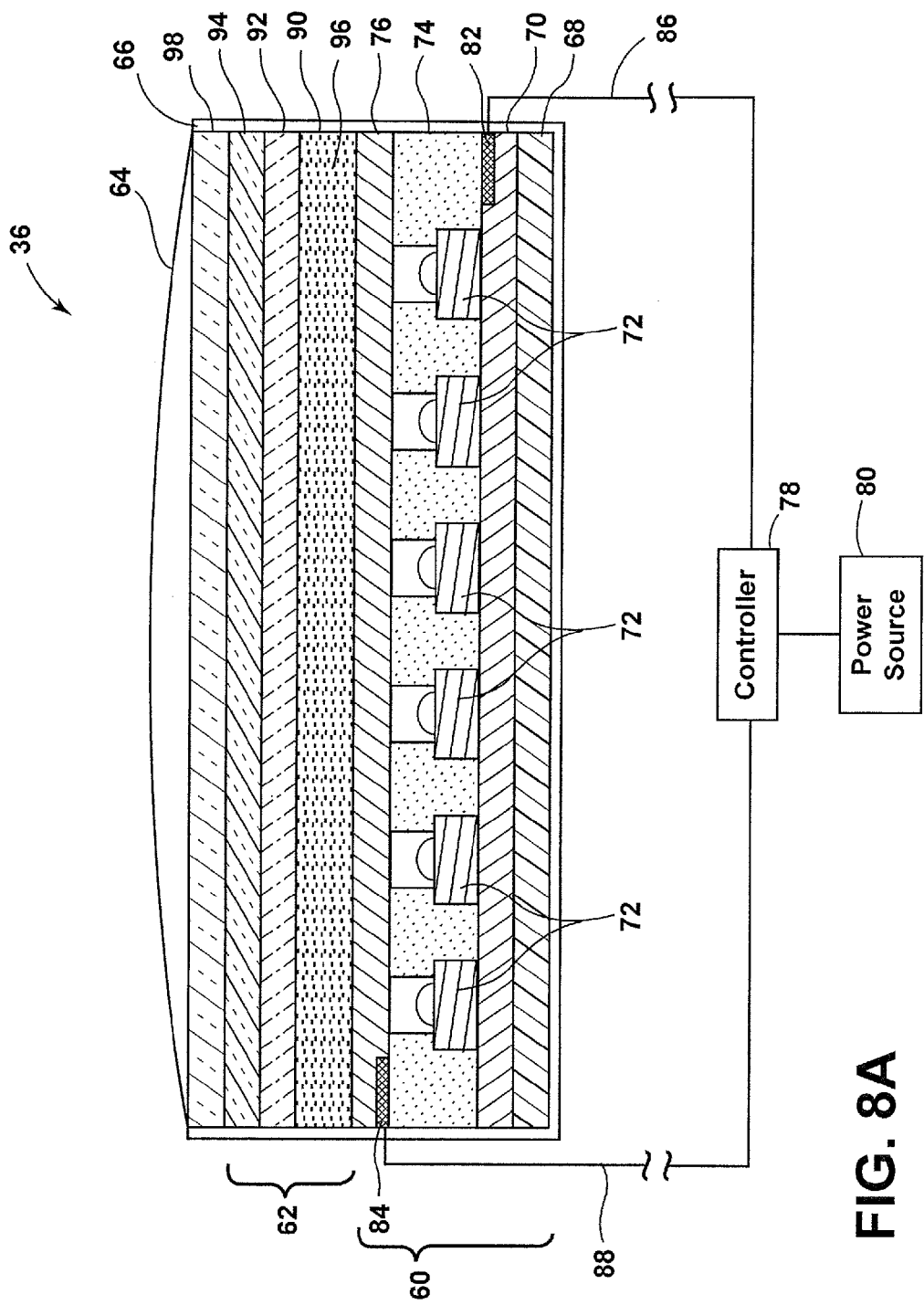
FIG. 8A is a cross-sectional view taken along line of FIG. 7 illustrating a light source according to one embodiment.

Referring to FIGS. 8A-8E, a cross-sectional view taken along the line VIII-VII of FIG. 7 illustrates the light source 36, according to one embodiment, capable of use on a vehicle 10 with an external photoluminescent structure 62. As illustrated in FIG. 8A, the light source 36 may have a stacked arrangement that includes a light-producing assembly 60, a photoluminescent structure 62, a viewable portion 64, and an overmold material 66. It should be appreciated that the viewable portion 64 and the overmold material 66 may be two separate components, or may be integrally formed as a single component.

The light-producing assembly 60 may correspond to a thin-film or printed light emitting diode (LED) assembly and includes a base member 68 as its lowermost layer. The base member 68 may include a polycarbonate, poly-methyl methacrylate (PMMA), or polyethylene terephthalate (PET) material, or any other material known in the art, on the order of 0.005 to 0.060 inches thick and is arranged over the intended vehicle 10 surface on which the light source 36 is to be received (e.g., bezel 24). Alternatively, as a cost saving measure, the base member 68 may directly correspond to a preexisting vehicle structure (e.g., the housing 22).

The light-producing assembly 60 includes a positive electrode 70 arranged over the base member 68. The positive electrode 70 includes a conductive epoxy such as, but not limited to, a silver-containing or copper-containing epoxy. The positive electrode 70 is electrically connected to at least a portion of a plurality of LED sources 72 arranged within a semiconductor ink 74 and applied over the positive electrode 70. Likewise, a negative electrode 76 is also electrically connected to at least a portion of the LED sources 72. The negative electrode 76 is arranged over the semiconductor ink 74 and includes a transparent or translucent conductive material such as, but not limited to, indium tin oxide. Additionally, each of the positive and negative electrodes 70, 76 are electrically connected to a controller 78 and a power source 80 via a corresponding bus bar 82, 84 and conductive leads 86, 88. The bus bars 82, 84 may be printed along opposite edges of the positive and negative electrodes 70, 76 and the points of connection between the bus bars 82, 84 and the conductive leads 86, 88 may be at opposite corners of each bus bar 82, 84 to promote uniform current distribution along the bus bars 82, 84. It should be appreciated that in alternate embodiments, the orientation of components within the light-producing assembly 60 may be altered without departing from the concepts of the present disclosure. For example, the negative electrode 76 may be disposed below the semiconductor ink 74 and the positive electrode 70 may be arranged over the aforementioned semiconductor ink 74. Likewise, additional components, such as the bus bars 82, 84 may also be placed in any orientation such that the light-producing assembly 60 may emit inputted light 100 (FIG. 8B) towards a desired location.

The LED sources 72 may be dispersed in a random or controlled fashion within the semiconductor ink 74 and may be configured to emit focused or non-focused light toward the photoluminescent structure 62. The LED sources 72 may correspond to micro-LEDs of gallium nitride elements on the order of about 5 to about 400 microns in size and the semiconductor ink 74 may include various binders and dielectric material including, but not limited to, one or more of gallium, indium, silicon carbide, phosphorous, and/or translucent polymeric binders.

The semiconductor ink 74 can be applied through various printing processes, including ink jet and silk screen processes to selected portion(s) of the positive electrode 70. More specifically, it is envisioned that the LED sources 72 are dispersed within the semiconductor ink 74, and shaped and sized such that a substantial quantity of the LED sources 72 align with the positive and negative electrodes 70, 76 during deposition of the semiconductor ink 74. The portion of the LED sources 72 that ultimately are electrically connected to the positive and negative electrodes 70, 76 may be illuminated by a combination of the bus bars 82, 84, controller 78, power source 80, and conductive leads 86, 88. According to one embodiment, the power source 80 may correspond to a vehicular power source 80 operating at 12 to 16 VDC. Additional information regarding the construction of light-producing assemblies is disclosed in U.S. Patent Publication No. 2014/0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Referring still to FIG. 8A, the photoluminescent structure 62 is arranged over the negative electrode 76 as a coating, layer, film or other suitable deposition. With respect to the presently illustrated embodiment, the photoluminescent structure 62 may be arranged as a multi-layered structure including an energy conversion layer 90, optional stability layer 92, and optional protection layer 94.

The energy conversion layer 90 includes at least one photoluminescent material 96 having energy converting elements with phosphorescent or fluorescent properties. For example, the photoluminescent material 96 may include organic or inorganic fluorescent dyes including rylenes, xanthenes, porphyrins, phthalocyanines. Additionally, or alternatively, the photoluminescent material 96 may include phosphors from the group of Ce-doped garnets such as YAG:Ce. The energy conversion layer 90 may be prepared by dispersing the photoluminescent material 96 in a polymer matrix to form a homogenous mixture using a variety of methods. Such methods may include preparing the energy conversion layer 90 from a formulation in a liquid carrier medium and coating the energy conversion layer 90 to the negative electrode 76 or other desired base member 68. The energy conversion layer 90 may be applied to the negative electrode 76 by painting, screen printing, flexography, spraying, slot coating, dip coating, roller coating, bar coating, and/or any other methods known in the art. Alternatively, the energy conversion layer 90 may be prepared by methods that do not use a liquid carrier medium. For example, the energy conversion layer 90 may be rendered by dispersing the photoluminescent material 96 into a solid state solution (homogenous mixture in a dry state) that may be incorporated in a polymer matrix formed by extrusion, injection seal, compression seal, calendaring, thermoforming, etc.

To protect the photoluminescent material 96 contained within the energy conversion layer 90 from photolytic and thermal degradation, the photoluminescent structure 62 may include the stability layer 92. The stability layer 92 may be configured as a separate layer optically coupled and adhered to the energy conversion layer 90 or otherwise integrated therewith. The photoluminescent structure 62 may also include the protection layer 94 optically coupled and adhered to the stability layer 92 or other layer (e.g., the energy conversion layer 90 in the absence of the stability layer 92) to protect the photoluminescent structure 62 from physical and chemical damage arising from environmental exposure. The stability layer 92 and/or the protection layer 94 may be combined with the energy conversion layer 90 through sequential coating or printing of each layer, sequential lamination or embossing, or any other suitable means. Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

In operation, the photoluminescent material 96 is formulated to become excited upon receiving inputted light 100 (FIG. 8B) of a specific wavelength from at least a portion of the LED sources 72 of the light-producing assembly 60. As a result, the inputted light 100 undergoes an energy conversion process and is re-emitted at a different wavelength. According to one embodiment, the photoluminescent material 96 may be formulated to convert inputted light 100 into a longer wavelength light, otherwise known as down conversion. Alternatively, the photoluminescent material 96 may be formulated to convert inputted light 100 into a shorter wavelength light, otherwise known as up conversion. Under either approach, light converted by the photoluminescent material 96 may be immediately outputted 102 (FIG. 8B) from the photoluminescent structure 62 or otherwise used in an energy cascade, wherein the converted light serves as inputted light 100 to excite another formulation of photoluminescent material 96 located within the energy conversion layer 90, whereby the subsequent converted light may then be outputted from the photoluminescent structure 62 or used as inputted light 100, and so on. With respect to the energy conversion processes described herein, the difference in wavelength between the inputted light 100 and the converted outputted light 102 is known as the Stokes shift and serves as the principle driving mechanism for an energy conversion process corresponding to a change in wavelength of light.

In alternate embodiments, the photoluminescent material 96 may be replaced with a phosphorescent material 40. Moreover, the phosphorescent material 40 may be configured as a long persistence material, as described above. Accordingly, the lighting assembly 12 may include a plurality of phosphorescent structures 18 within the lighting assembly 12.

With continued reference to FIG. 8A, the viewable portion 64 is arranged over the photoluminescent structure 62. In some embodiments, the viewable portion 64 may include a plastic, silicon, or urethane material and is molded over the photoluminescent structure 62 and light-producing assembly 60. Preferably, the viewable portion 64 should be at least partially light transmissible. In this manner, the viewable portion 64 will be illuminated by the photoluminescent structure 62 whenever an energy conversion process is underway. Additionally, by over-sealing the viewable portion 64, it may also function to protect the photoluminescent structure 62 and the light-producing assembly 60. The viewable portion 64 may be arranged in a planar shape and/or an arcuate shape to enhance its viewing potential when in a luminescent state. Like the photoluminescent structure 62 and the light-producing assembly 60, the viewable portion 64 may also benefit from a thin design, thereby helping to fit the light source 36 into small package spaces of the vehicle 10.

In some embodiments, a decorative layer 98 may be disposed between the viewable portion 64 and the photoluminescent structure 62. The decorative layer 98 may include a polymeric material or other suitable material and is configured to control or modify an appearance of the viewable portion 64 of the light source 36. For example, the decorative layer 98 may be configured to confer a metallic appearance to the viewable portion 64 when the viewable portion 64 is in an unilluminated state. In other embodiments, the decorative layer 98 may be tinted any color to complement the vehicle structure on which the light source 36 is to be received. For example, the decorative layer 98 may be similar in color to that of the remaining portions of the housing 22 so that the lighting assembly 12 is substantially hidden when in the unilluminated state. Alternatively, the decorative layer 98 may provide indicia 20 and/or an emblem such that the decorative layer 98 and the indicia 20 may be backlit and/or otherwise illuminated by the light-producing assembly 60. In any event, the decorative layer 98 should be at least partially light transmissible such that the photoluminescent structure 62 is not prevented from illuminating the viewable portion 64 whenever an energy conversion process is underway.

The overmold material 66 is disposed around the light-producing assembly 60 and photoluminescent structure 62 and may be formed integrally with the viewable portion 64. The overmold material 66 may protect the light-producing assembly 60 from a physical and chemical damage arising from environmental exposure. The overmold material 66 may have viscoelasticity (i.e., having both viscosity and elasticity), a low Young's modulus, and/or a high failure strain compared with other materials so that the overmold material 66 may protect the light-producing assembly 60 when contact is made thereto. For example, the overmold material 66 may protect the light-producing assembly 60 from the environmental factors.

In some embodiments, the photoluminescent structure 62 may be employed separate and away from the light-producing assembly 60. For example, the photoluminescent structure 62 may be positioned on a vehicle component or surface proximate, but not in physical contact, with the light-producing assembly 60, as will be described in more detail below. It should be understood that in embodiments where the photoluminescent structure 62 is incorporated into distinct components separated from the light source 36, the light source 36 may still have the same or similar structure to the light source 36 described in reference to FIG. 8A.

Figure 8B:
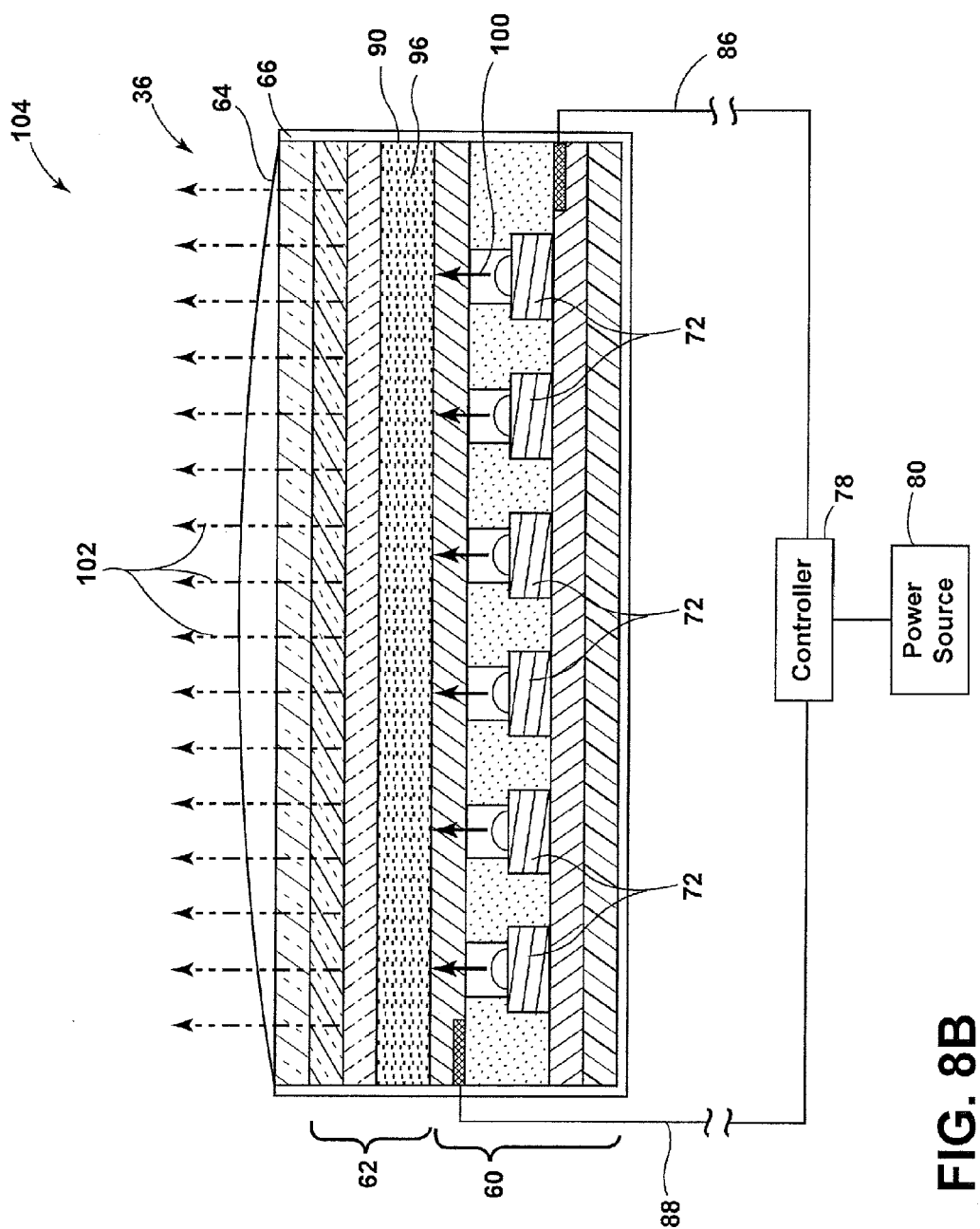
FIG. 8B is a cross-sectional view taken along line of FIG. 7 further illustrating the light source, according to one embodiment.

Referring to FIG. 8B, an energy conversion process 104 for producing single color luminescence is illustrated according to one embodiment. For purposes of illustration, the energy conversion process 104 is described below using the light source 36 depicted in FIG. 8A. In this embodiment, the energy conversion layer 90 of the photoluminescent structure 62 includes a single photoluminescent material 96, which is configured to convert inputted light 100 received from LED sources 72 into an outputted light 102 having a wavelength different than that associated with the inputted light 100. More specifically, the photoluminescent material 96 is formulated to have an absorption spectrum that includes the emission wavelength of the inputted light 100 supplied from the LED sources 72. The photoluminescent material 96 is also formulated to have a Stokes shift resulting in the converted visible outputted light 102 having an emission spectrum expressed in a desired color, which may vary per lighting application. The converted visible outputted light 102 is outputted from the light source 36 via the viewable portion 64, thereby causing the viewable portion 64 to illuminate in the desired color. In one embodiment, the energy conversion process 104 is undertaken by way of down conversion, whereby the inputted light 100 includes light on the lower end of the visibility spectrum such as blue, violet, or ultraviolet (UV) light. Doing so enables blue, violet, or UV LEDs to be used as the LED sources 72, which may offer a relative cost advantage over simply using LEDs of the desired color and foregoing the energy conversion, process altogether. Furthermore, the illumination provided by the viewable portion 64 may offer a unique, substantially uniform, and/or attractive viewing experience that may be difficult to duplicate through non-photoluminescent means.

Figure 8C:
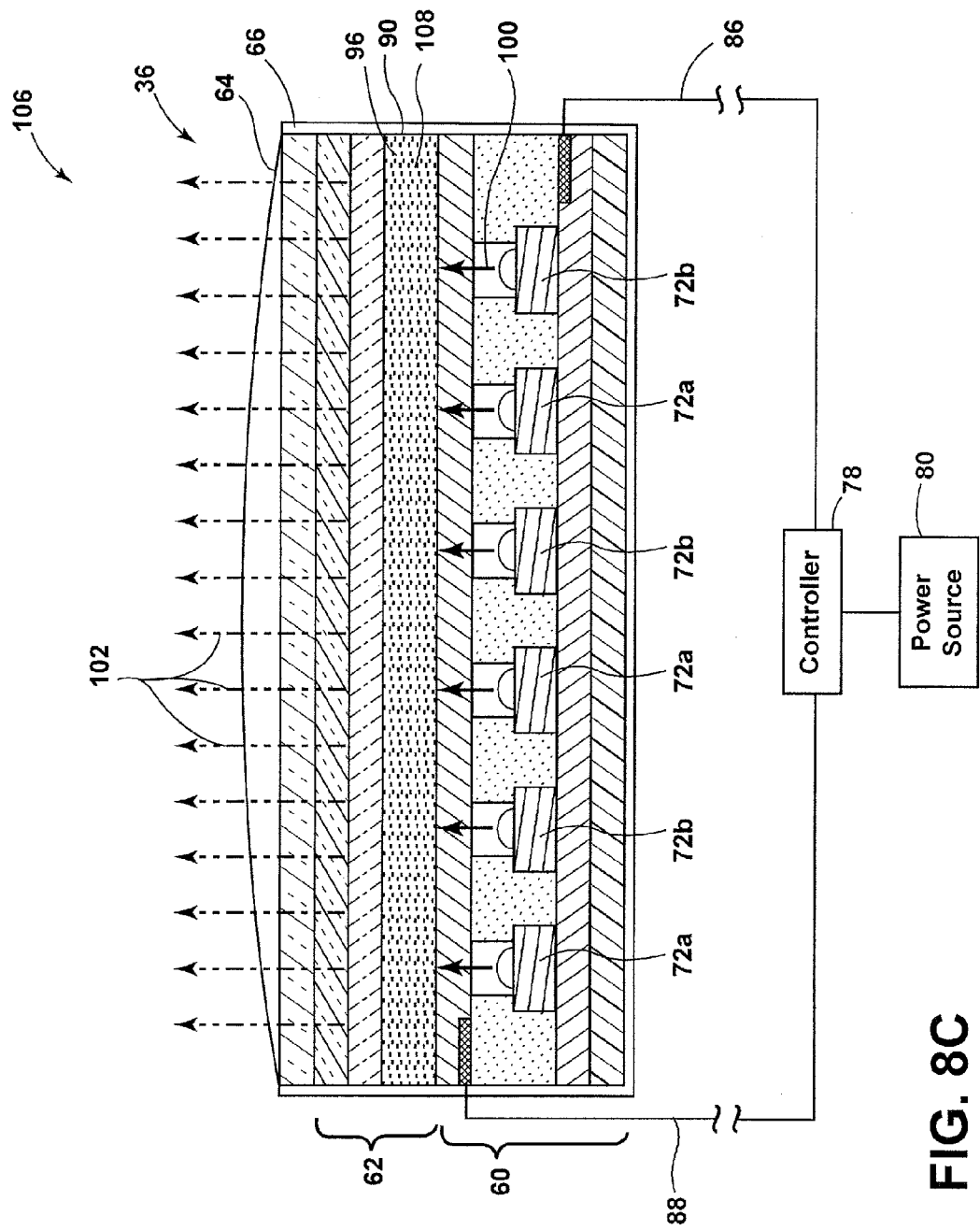
FIG. 8C is a cross-sectional view taken along line of FIG. 7 illustrating an alternate light source, according to one embodiment.

Referring to FIG. 8C, a second energy conversion process 106 for generating multiple colors of light is illustrated according to one embodiment. For consistency, the second energy conversion process 106 is also described below using the light source 36 depicted in FIG. 8A. In this embodiment, the energy conversion layer 90 includes the first and second photoluminescent materials 96, 108 that are interspersed within the energy conversion layer 90. Alternatively, the photoluminescent materials 96, 108 may be isolated from each other if desired. Also, it should be appreciated that the energy conversion layer 90 may include more than two different photoluminescent materials 96, 108, in which case, the concepts provided herein similarly apply. In one embodiment, the second energy conversion process 106 occurs by way of down conversion using blue, violet, and/or UV light as the source of excitation.

With respect to the presently illustrated embodiment, the excitation of photoluminescent materials 96, 108 is mutually exclusive. That is, photoluminescent materials 96, 108 are formulated to have non-overlapping absorption spectrums and Stoke shifts that yield different emission spectrums. Also, in formulating the photoluminescent materials 96, 108, care should be taken in choosing the associated Stoke shifts such that the converted outputted light 102 emitted from one of the photoluminescent materials 96, 108, does not excite the other, unless so desired. According to one exemplary embodiment, a first portion of the LED sources 72, exemplarily shown as LED sources 72a, is configured to emit an inputted light 100 having an particular wavelength that only excites photoluminescent material 96 and results in the inputted light 100 being converted into a visible light outputted 102 of a first color (e.g., white). Likewise, a second portion of the LED sources 72, exemplarily shown as LED sources 72b, is configured to emit an inputted light 100 having an particular wavelength that only excites second photoluminescent material 108 and results in the inputted light 100 being converted into a visible outputted light 102 of a second color (e.g., red). Preferably, the first and second colors are visually distinguishable from one another. In this manner, LED sources 72a and 72b may be selectively activated using the controller 78 to cause the photoluminescent structure 62 to luminesce in a variety of colors. For example, the controller 78 may activate only LED sources 72a to exclusively excite photoluminescent material 96, resulting in the viewable portion 64 illuminating in the first color. Alternatively, the controller 78 may activate only LED sources 72b to exclusively excite the second photoluminescent material 108, resulting in the viewable portion 64 illuminating in the second color.

Alternatively still, the controller 78 may activate LED sources 72a and 72b in concert, which causes both of the photoluminescent materials 96, 108 to become excited, resulting in the viewable portion 64 illuminating in a third color, which is a color mixture of the first and second color (e.g., pinkish). The intensities of the inputted light 100 emitted from each LED source 72a, 72d may also be proportionally varied to one another such that additional colors may be obtained. For energy conversion layers 90 containing more than two distinct photoluminescent materials 96, 108, a greater diversity of colors may be achieved. Contemplated colors include red, green, blue, and combinations thereof, including white, all of which may be achieved by selecting the appropriate photoluminescent materials and correctly manipulating their corresponding LED sources 72.

Figure 8D:
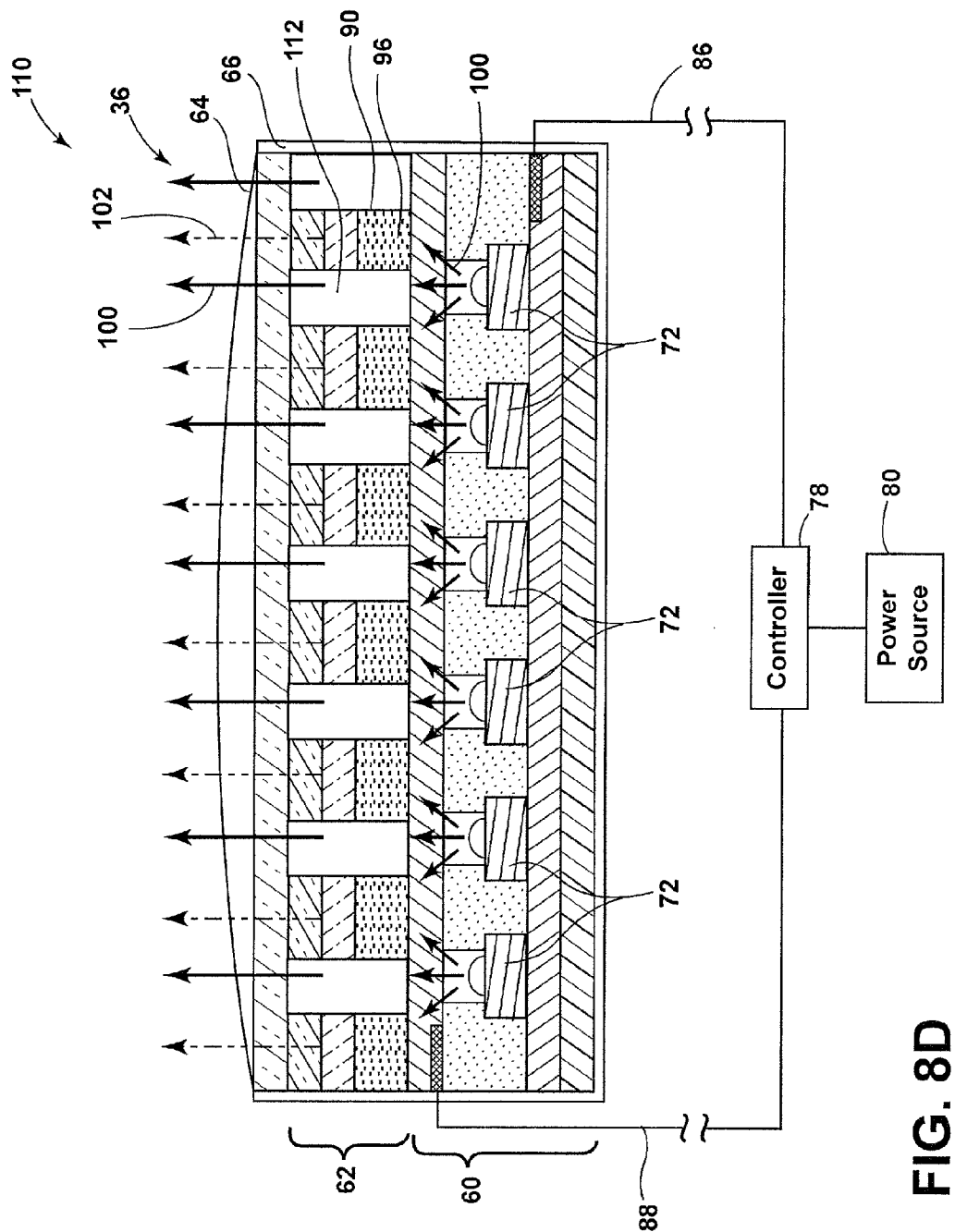
FIG. 8D is a cross-sectional view taken along line of FIG. 7 illustrating a light source having a luminescent structure separated by light transmissive portions disposed on the light source, according to one embodiment.

Referring to FIG. 8D, a third energy conversion process 110 includes a light-producing assembly 60, such as the one described in reference to FIG. 8A, and a photoluminescent structure 62 disposed thereon is illustrated, according to an alternate embodiment. The photoluminescent structure 62 is configured to convert inputted light 100 received from LED sources 72 into a visible outputted light 102 having a wavelength different than that associated with the inputted light 100. More specifically, the photoluminescent structure 62 is formulated to have an absorption spectrum that includes the wavelength of the inputted light 100 supplied from the LED sources 72. The photoluminescent material 96 is also formulated to have a Stokes shift resulting in the converted visible outputted light 102 having an emission spectrum expressed in a desired color, which may vary per lighting application.

The photoluminescent structure 62 may be applied to only a portion of the light-producing assembly 60, for example, in a stripped manner. Between the photoluminescent structures 62 may be light transmissive portions 112 that allow inputted light 100 emitted from the LED sources 72 to pass therethrough at the first wavelength. The light transmissive portions 112 may be an open space, or may be a transparent or translucent material. The inputted light 100 emitted through the light transmissive portions 112 may be directed from the light-producing assembly 60 towards a second photoluminescent structure 132 (FIG. 5) disposed proximate to the light-producing assembly 60 and/or towards the phosphorescent structure 18 for exciting the phosphorescent material 40 therein. The second photoluminescent structure 132 may be configured to luminesce in response to the inputted light 100 that is directed through the light transmissive portions 112.

Figure 8E:
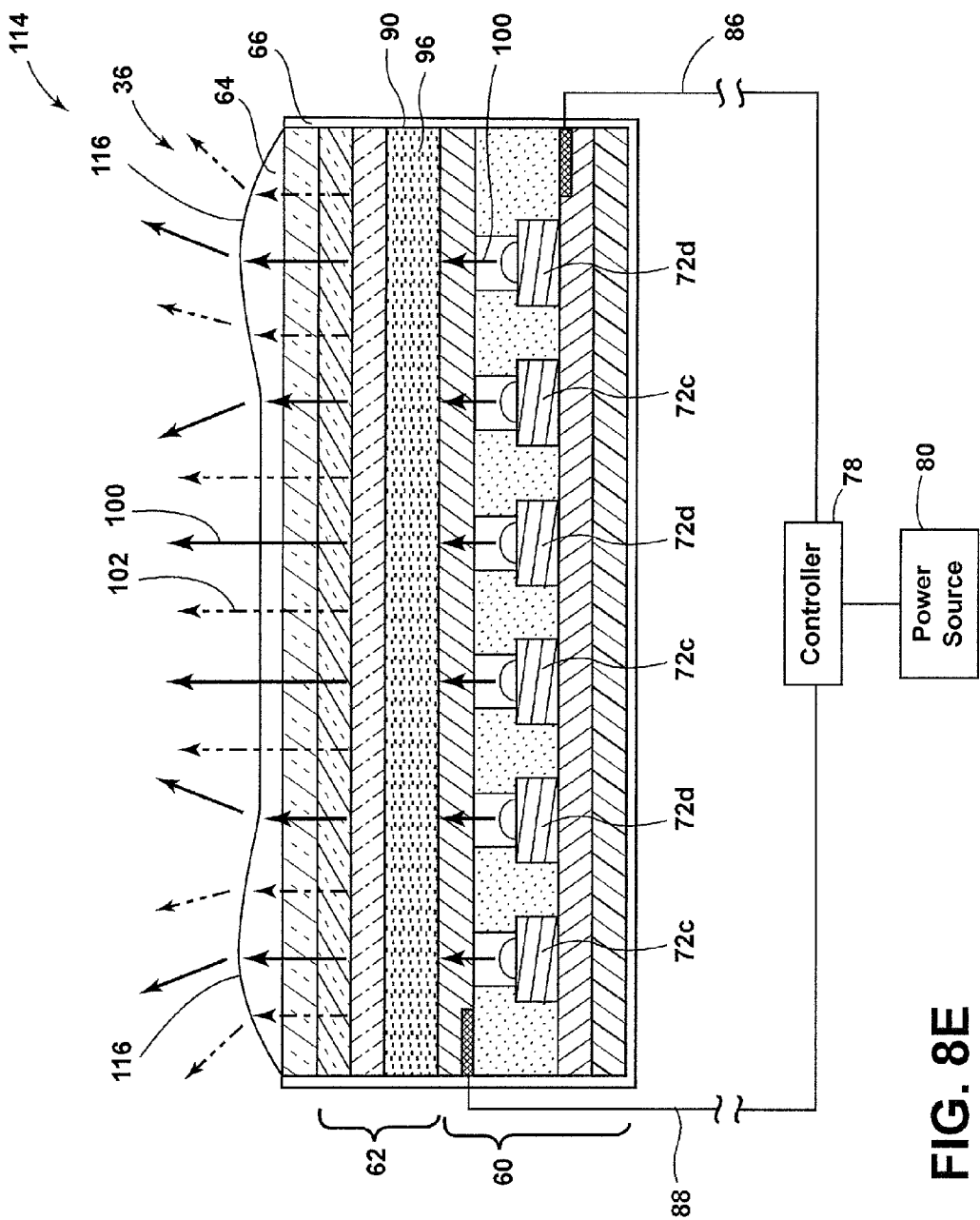
FIG. 8E is a cross-sectional view taken along line of FIG. 7 illustrating an alternate light source having a luminescent structure disposed on the light source configured to convert a portion of light emitted from the light source from a first wavelength to a second wavelength, according to one embodiment.

Referring to FIG. 8E, a fourth energy conversion process 114 for generating multiple colors of light utilizing the light-producing assembly 60, such as the one described in reference to FIG. 8A, and a photoluminescent structure 62 disposed thereon is illustrated. In this embodiment, the photoluminescent structure 62 is disposed over a top portion of the light-producing assembly 60. The excitation of photoluminescent material 96 is formulated such that a portion of inputted light 100 emitted from the LED sources 72 passes through the photoluminescent structure 62 at the first wavelength (i.e., the inputted light 100 emitted from the light source 36 is not converted by the photoluminescent structure 62). The intensity of the emitted inputted light 100 may be modified by pulse-width modulation or current control to vary the amount of inputted light 100 emitted from the LED sources 72 that passes through the photoluminescent structure 62 without converting to a second, outputted 102 wavelength. For example, if the light source 36 is configured to emit inputted light 100 at a low level, substantially all of the inputted light 100 may be converted to the second wavelength of outputted light 102. In this configuration, a color of outputted light 102 corresponding to the photoluminescent structure 62 may be emitted from the light-producing assembly 60. If the light source 36 is configured to emit inputted light 100 at a high level, only a portion of the first wavelength may be converted by the photoluminescent structure 62. In this configuration, a first portion of the inputted light 100 may be converted by the photoluminescent structure 62 and a second portion of the inputted light 100 may be emitted from the light-producing assembly 60 at the first wavelength towards additional photoluminescent structures 132 disposed proximately to the light source 36. The additional photoluminescent structures 132 may luminesce in response to the inputted light 100 emitted from the light source 36.

According to one exemplary embodiment, a first portion of the LED sources 72, exemplarily shown as LED sources 72a is configured to emit an inputted light 100 having a wavelength that excites the photoluminescent material 96 within the photoluminescent structure 62 and results in the inputted light 100 being converted into a visible outputted light 102 of a first color (e.g., white). Likewise, a second portion of the LED sources 72, exemplarily shown as LED sources 72c, is configured to emit an inputted light 100 having a wavelength that passes through the photoluminescent structure 62 and excites additional photoluminescent structures 132 disposed proximately to the lighting assembly 12 thereby illuminating in a second color. The first and second colors may be visually distinguishable from one another. In this manner, LED sources 72a and 72c may be selectively activated using the controller 78 to cause the lighting assembly 12 to luminesce in a variety of colors.

The light-producing assembly 60 may also include optics 116 that are configured to direct inputted light 100 emitted from the LED sources 72a, 72c and the outputted light 102 emitted from the photoluminescent structure 62 towards pre-defined locations. For example, the inputted light 100 emitted from the LED sources 72a, 72c and the photoluminescent structure 62 may be directed and/or focused towards the phosphorescent structure 18 and/or any other location proximate to the light source 36.

Figure 9:
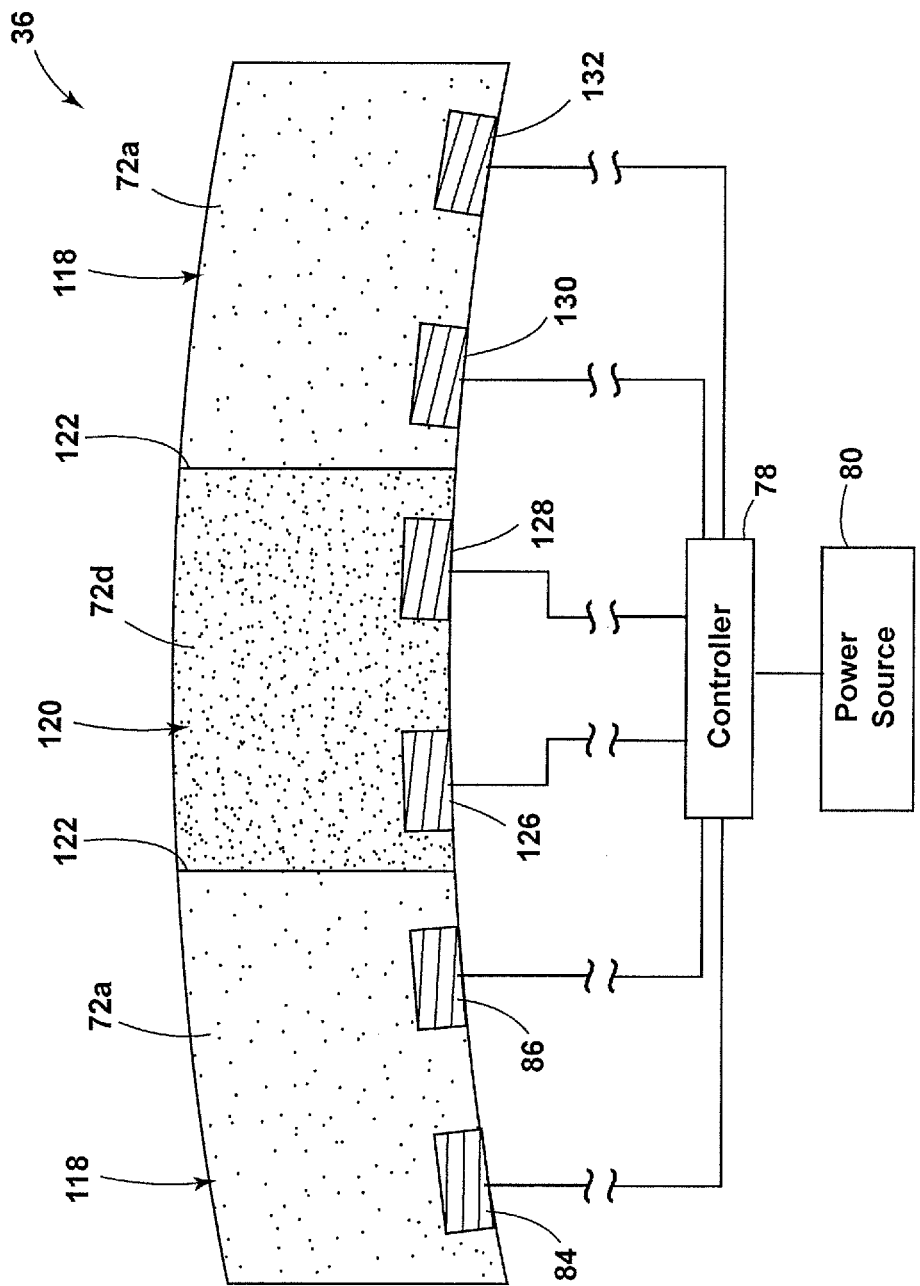
FIG. 9 illustrates a top view of a light-producing assembly, according to one embodiment, having varying types and concentrations of LED sources transversely along the light-producing assembly.

Referring to FIG. 9, a light-producing assembly 60, according to one embodiment, is illustrated from a top view having varying types and concentrations of LED sources 72a, 72d transversely along the light-producing assembly 60. As illustrated, a first portion 118 of the light-producing assembly 60 includes LED sources 72a that are configured to emit an inputted light 100 having an emission wavelength in a first color (e.g., white) spectrum. Likewise, a second portion 120 of the light-producing assembly 60 includes LED sources 72d that are configured to emit an inputted light 100 having an emission wavelength in a second color (e.g., red) spectrum. The first and second portions 118, 120 of the light-producing assembly 60 may be separated by insulative, or non-conductive, barriers 122 from proximately disposed portions through any means known in the art such that each portion 118, 120 may be illuminated independently of any other portion 118, 120. Further, each portion 118, 120 disposed within the light-producing assembly 60 may include a respective bus bar 82, 84, 124, 126, 128, 130, 132 coupled to the controller 78 and configured to illuminate each respective portion 118, 120. It should be appreciated that the bus bars 82, 84, 124, 126, 128, 130, 132 may be coupled to each portion 118, 120 of the light-producing assembly 60 on opposing sides in alternate embodiments, as described above.

According to one embodiment, the first and second colors are visually distinguishable from one another. In this manner, LED sources 72a and 72d may be selectively activated using the controller 78 to cause the LED sources 72a, 72d to illuminate in a variety of colors. For example, the controller 78 may activate only LED sources 72a to exclusively illuminate a portion 118 of the light-producing assembly 60 in the first color. Alternatively, the controller 78 may activate only LED sources 72d to exclusively illuminate a portion 120 of the light-producing assembly 60 in the second color. It should be appreciated that the light-producing assembly 60 may include any number of portions 118, 120 having varying LED sources 72a, 72d that may illuminate in any desired color. Moreover, it should also be appreciated that the portions having varying LED sources 72a, 72d may be orientated in any practicable manner and need not be disposed adjacently. Moreover, each portion 118, 120 may illuminate in the same color regionally or fully illuminate the entire circumference of the bezel 24.

The semiconductor ink 74 may also contain various concentrations of LED sources 72a, 72d such that the density of the LED sources 72a, 72d, or number of LED sources 72a, 72d per unit area, may be adjusted for various lighting applications. In some embodiments, the density of LED sources 72a, 72d may vary across the length of the light source 36. For example, a central portion 120 of the light-producing assembly 60 may have a greater density of LED sources 72 than peripheral portions 118, or vice versa. In such embodiments, the light source 36 may appear brighter or have a greater luminance in order to preferentially illuminate pre-defined locations. In other embodiments, the density of LED sources 72a, 72d may increase or decrease with increasing distance from a preselected point.

Figure 10:
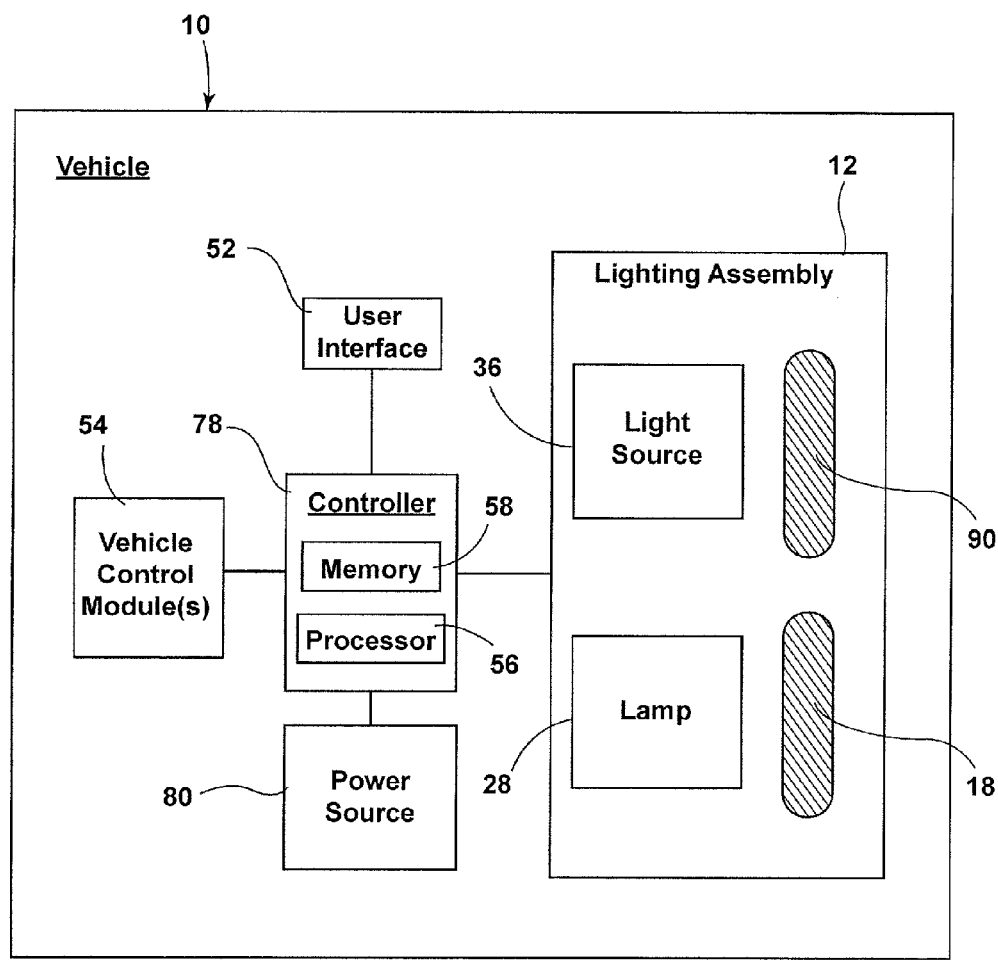
FIG. 10 is a block diagram of the vehicle and the lighting assembly.

Referring to FIG. 10, a block diagram of a vehicle 10 is generally shown in which the lighting assembly 12 is implemented. The lighting assembly 12 includes a controller 78 in communication with the light source 36. The controller 78 may include memory 58 having instructions contained therein that are executed by a processor 56 of the controller 78. The controller 78 may provide electrical power to the light source 36, or to a respective bus bar 82, 84, via a power source 80 located onboard the vehicle 10. In addition, the controller 78 may be configured to control the inputted light 100 emitted from each light source 36 and/or the illumination of any lamp 28 within the lighting assembly 12 based on feedback received from one or more vehicle control modules 54 such as, but not limited to, a body control module, engine control module, steering control module, brake control module, the like, or a combination thereof. By controlling the inputted light 100 emitted from the light source 36 and/or the illumination of any lamp 28 within the lighting assembly 12, the lighting assembly 12 may illuminate in a variety of colors and/or patterns to provide an aesthetic appearance, or may provide vehicle information to an intended observer. For example, when the lighting assembly 12 is illuminated, the lighting assembly 12 may notify an occupant of the vehicle 10 about a specific condition of the vehicle 10.

In operation, the phosphorescent structure 18 receives an activation emission and, in response, emits light therefrom. The phosphorescent structure 18 may contain long persistent phosphorescent material 40 such that the phosphorescent structure 18 continues to emit light for a period of time after the activation emission is no longer present. For example, according to one embodiment, the phosphorescent structure 18 may continue to emit light for four hours after the removal of the activation emission.

In an alternate embodiment, the second light source 50 may pulse light at predefined times, such as every five minutes, to re-excite the phosphorescent material 40 such that the phosphorescent structure 18 continues to emit light above a pre-defined intensity. The controller 78 may pulse light from any light source 36 and/or lamp 28 at any frequency without departing from the teachings provided herein.

The photoluminescent structure 62 may exhibit periodic unicolor or multicolor illumination. For example, the controller 78 may prompt the light source 36 to periodically emit only the first wavelength of inputted light 100 via the LED sources 72 to cause the photoluminescent structure 62 to periodically illuminate in the first color. Alternatively, the controller 78 may prompt the light source 36 to periodically emit only the second wavelength of inputted light 100 via LED sources 72 to cause the photoluminescent structure 62 to periodically illuminate in the second color. Alternatively, the controller 78 may prompt the light source 36 to simultaneously and periodically emit the first and second wavelengths of inputted light 100 to cause the photoluminescent structure 62 to periodically illuminate in a third color defined by an additive light mixture of the first and second colors. Alternatively still, the controller 78 may prompt the light source 36 to alternate between periodically emitting the first and second wavelengths of inputted light 100 to cause the photoluminescent structure 62 to periodically illuminate by alternating between the first and second colors. The controller 78 may prompt the light source 36 to periodically emit the first and/or second wavelengths of inputted light 100 at a regular time interval and/or an irregular time interval.

In another embodiment, the lighting assembly 12 may include a user interface 52. The user interface 52 may be configured such that a user may control the wavelength of inputted light 100 that is emitted by the LED sources 72 and/or the LED sources 72 that are illuminated. Such a configuration may allow a user to control the illumination patterns of the lighting assembly 12.

With respect to the above examples, the controller 78 may modify the intensity of the emitted first and second wavelengths of inputted light 100, the light emitted from any lamp 28, and/or the second light source 50 by pulse-width modulation or current control. In some embodiments, the controller 78 may be configured to adjust a color of the emitted light by sending control signals to adjust an intensity or energy output level of the light source(s) 36 and/or lamp 28. For example, if the light source(s) 36 and/or lamp 28 is configured to emit inputted light 100 at a low level, substantially all of inputted light 100 may be converted to the outputted light 102. In this configuration, a color of light corresponding to the outputted light 102 may correspond to the color of the emitted light from the lighting assembly 12. If the light source(s) 36 and/or lamp 28 is configured to emit inputted light 100 at a high level, only a portion of the inputted light 100 may be converted to the outputted light 102. In this configuration, a color of light corresponding to mixture of the inputted light 100 and the outputted light 102 may be output as the emitted light. In this way, each of the controllers 78 may control an output color of the emitted light.

Though a low level and a high level of intensity are discussed in reference to the inputted light 100, it shall be understood that the intensity of the inputted light 100 may be varied among a variety of intensity levels to adjust a hue of the color corresponding to the emitted light from the lighting assembly 12. The variance in intensity may be manually altered, or automatically varied by the controller 78 based on pre-defined conditions. According to one embodiment, a first intensity may be output from the lighting assembly 12 when a light sensor senses daylight conditions. A second intensity may be output from the lighting assembly 12 when the light sensor determines the vehicle 10 is operating in a low light environment.

As described herein, the color of the outputted light 102 may be significantly dependent on the particular photoluminescent materials 96 utilized in the photoluminescent structure 62. Additionally, a conversion capacity of the photoluminescent structure 62 may be significantly dependent on a concentration of the photoluminescent material 96 utilized in the photoluminescent structure 62. By adjusting the range of intensities that may be output from the light source(s) 36 and/or lamp 28, the concentration, types, and proportions of the photoluminescent materials 96 in the photoluminescent structure 62 discussed herein may be operable to generate a range of color hues of the emitted light by blending the inputted light 100 with the outputted light 102.

Accordingly, a lighting assembly employing one or more phosphorescent and/or photoluminescent structures that are configured to illuminate in response to pre-defined events has been advantageously provided herein. The lighting assembly retains its structural properties while providing luminescent light having both functional and decorative characteristics. In some embodiments, a light source may implement a thin design, thereby helping to fit the light source into small package spaces of the vehicle where traditional light sources may not be practicable.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle lighting assembly comprising:
   a housing including a lens and a bezel;
   a lamp arranged to direct light through the lens;
   a phosphorescent indicia disposed on the lens, wherein the phosphorescent indicia is configured to emit light in response to an activation emission; and
   a light source configured to illuminate a portion of the bezel.

2. The vehicle lighting assembly of claim 1, wherein the lighting assembly is used as a headlamp and the housing comprises a bezel that surrounds the lens.

3. The vehicle lighting assembly of claim 1, wherein the phosphorescent indicia is translucent such that light emitted from the lamp is unimpeded by the phosphorescent indicia on the lens.

4. The vehicle lighting assembly of claim 1, wherein the lamp is configured as a projector lamp.

5. The vehicle lighting assembly of claim 1, wherein the phosphorescent indicia is activated by ambient light illuminating an area proximate the housing.

6. The vehicle lighting assembly of claim 1, wherein the phosphorescent indicia is activated by the lamp.

7. The vehicle lighting assembly of claim 6, wherein the phosphorescent indicia includes a long persistent phosphor material that is configured to emit light for more than 10 minutes after an activation emission is not present.

8. The vehicle lighting assembly of claim 1, further comprising:
   a light guide operably coupled with the light source to illuminate a portion of the bezel.

9. A vehicle headlamp assembly comprising:
   a housing having a bezel and a lens;
   a lamp arranged to direct light through the lens;
   a printed LED configured to illuminate a portion of the housing; and
   indicia formed from a phosphorescent structure disposed on the lens, wherein the phosphorescent structure is configured to luminesce in response to an activation emission supplied by the printed LED.

10. The vehicle headlamp assembly of claim 9, wherein the phosphorescent structure comprises at least one photoluminescent material configured to down convert an inputted light received from at least a portion of the printed LED into a visible light that is outputted to a viewable portion.

11. A vehicle lighting assembly comprising:
    a housing including a lens;
    a bezel including a light source illuminable in a plurality of patterns based on a vehicular condition;
    a lamp arranged to direct light through the lens at a first intensity; and
    a phosphorescent structure disposed on the lens and configured to emit light in response to an activation emission at a second intensity, wherein the first intensity is greater than the second intensity.

12. The vehicle lighting assembly of claim 11, wherein the light source, the lamp, and an ambient light may each charge a phosphorescent material within the phosphorescent structure.

13. The vehicle lighting assembly of claim 11, wherein the light source comprises a plurality of printed LEDs.

14. The vehicle lighting assembly of claim 11, further comprising a controller for controlling an activation state of the light source in response to at least one vehicle-related condition.

15. The vehicle lighting assembly of claim 11, wherein the phosphorescent structure has a translucent white color in a non-activated state and emits blue light in an activated state.

* * * * *